United States Patent Office 3,433,585
Patented Mar. 18, 1969

3,433,585
PROCESS FOR THE MANUFACTURE OF CONDENSED ALKALI METAL PHOSPHATES
Wolfgang Brockmüller, Dortmund-Syburg, and Gerhard Hartlapp and Horst-Heinrich Weizenkorn, Hermulheim, near Cologne, Germany, assignors to Knapsack Aktiengesellschaft, Knapsack, near Cologne, Germany, a corporation of Germany
No Drawing. Filed July 20, 1965, Ser. No. 473,507
Claims priority, application Germany, July 22, 1964, K 53,530
U.S. Cl. 23—106                                 7 Claims
Int. Cl. C01b 25/30

ABSTRACT OF THE DISCLOSURE

A single step process for producing substantially pure condensed alkali metal polyphosphates by utilizing the corresponding impure neutralized phosphate alkali salt solution containing up to 5000 p.p.m. fluorine based on $P_2O_5$, comprising spraying substantially neutralized alkali phosphate salt solution in a tower under temperature and moisture conditions to effect issuance of off-gas at not less than 300° C. and containing 150–400 gm. water per kg. gas said phosphate solution containing about 40–70% solids.

---

The present invention provides a process for the manufacture of condensed alkali metal phosphates, more especially of pyro- and tripolyphosphates, from phosphate solutions such as are obtained in conventional manner from phosphoric acid which has been prepared by subjecting crude phosphates to wet processing treatment, has been purified and has been neutralized so as to contain alkali metal oxide and $P_2O_5$ in a ratio corresponding to that desired to be obtained for a final product.

It is known that phosphate solutions such as described above enable condensed alkali metal phosphates to be prepared. To this end, the solution is initially sprayed in a first step and the resulting calcined product is then tempered in a second step for a prolonged period at an elevated temperature to be transformed into the substance desired to be obtained. These processes have the disadvantage of being carried out in several stages and of requiring long reaction times which unfavorably affect the space/time yields.

It is also known that phosphate solutions of the type described above and obtained by neutralizing phosphoric acids such as prepared from phosphorus produced by electrothermal means can be sprayed in a single step in a spray tower. The phosphoric acids so produced are very pure, especially as regards their fluorine content.

As opposed thereto, phosphoric acids such as prepared by wet processing treatment, i.e. by treating crude phosphates with a strong mineral acid, which is preferably sulfuric acid, are rather contaminated.

Such wet treatment processes have been described, for example, in U.S. Patent No. 2,950,171, in Belgian Patent No. 621,425, in British Patent No. 913,831, in French Patents Nos. 1,181,150 and 1,294,872 and in German Patent No. 1,027,647.

Contaminations included in phosphoric acids must be eliminated in all those cases where the acids are intended for use in the manufacture of pure phosphates. This is done in conventional manner in several stages. Initially, the phosphoric acid is partially neutralized so as to first cause fluorine which is present in the form of silicofluoride to precipitate and thereafter to cause sulfate and arsenic to precipitate by adding either BaS or a mixture comprising BaS and $BaCO_3$; the phosphoric acid is then further neutralized to separate metal contaminations, such as iron, aluminum, chromium and vanadium.

Purification processes of this type have already been described in various patents, e.g. in U.S. Patents Nos. 2,044,940, 2,081,351, 2,174,158, 2,883,266, in French Patent No. 1,334,533, and in German Patent No. 721,410.

Despite their having been subjected to purification, the phosphate solutions obtained by such processes still include considerable amounts of fluorine. This is the reason why they have not previously been used in single stage spray-drying processes when a very pure final product is desired to be obtained, e.g. for making condensed alkali metal phosphates, such as sodium tripolyphosphate for use in the detergent industries. Proposals have already been made to prepare ortho-phosphates from neutralized wet phosphoric acid in a spray tower, but nothing has been disclosed with respect to the reaction conditions to be employed or with respect to the elimination of disturbing fluorine compounds. Suggestions have, however, been made that phosphate solutions prepared from wet phosphoric acid be freed from fluorine contaminations by means of complicated processes, for example, by causing hot combustion gases and steam to flow simultaneously through such solutions. As mentioned above, these are complicated and time-consuming processes which produce but a completely unsatisfactory and relatively minor defluorination effect.

Contrary to any existing prejudice, it has now unexpectedly been found that condensed phosphates obtained under specific process conditions by a single stage spray-drying process from a solution of the type described contain considerably lesser fluorine than the starting phosphate solutions. The following table indicates the fluoride content in parts per million and related to $P_2O_5$ of phosphates which have been prepared from identical solutions with various fluorine contents save that the solutions had once been evaporated and had once been sprayed in a single stage process.

TABLE

| Evaporated: | Sprayed |
|---|---|
| 200 | 40 |
| 320 | 40 |
| 400 | 40 |

The present invention provides more especially a process for the manufacture of condensed alkali metal phosphates, especially pyro- and tripolyphosphates, which comprises using a phosphate solution of the type obtained in conventional manner from a phosphoric acid which has been (a) prepared by subjecting crude phosphates to wet processing treatment, (b) purified and (c) neutralized so as to contain alkali metal oxide and $P_2O_5$ in a ratio corresponding to that desired to be obtained for a final product, and spraying the said solutions which contain fluorine in a proportion of 100 to 5000 parts per million, preferably in a proportion of 300 to 4500 parts per million, related to $P_2O_5$, in a single step in a spray tower under conditions selected to ensure that gases issuing from the spray tower have a temperature above 300° C., advantageously a temperature of between 340 and 420° C., and contain, per kg. issuing gas, moisture in a proportion of 150 to 400 grams, preferably 200 to 300 grams, water, the starting phosphate solutions containing solid matter in a proportion of 40 to 70% by weight, preferably in a proportion of about 50% by weight.

The advantage offered by the process of the present invention as compared with conventional methods resides in the fact that phosphate solutions containing a relatively large proportion of fluorine enable pure condensed phosphates to be produced by a single stage spray process with favorable space/time yields.

It is naturally possible and within the scope of the present invention to admix, prior to their being sprayed, the phosphate solutions obtained by wet processing with any desired proportion of a phosphoric acid or phosphate solution which was prepared from phosphorus such as produced by electrothermal means.

The following examples serve to illustrate the present invention but they are not intended to limit it thereto:

Example 1

100 kg. wet phosphoric acid, produced by reacting calcined Marocco-phosphate with sulfuric acid, were admixed with 12 kg. 50% sodium hydroxide solution and 4.5 kg. commercial barium sulfide. Precipitated matter was separated by means of a filter press and the filtrate was neutralized with 60 kg. 50% sodium hydroxide solution until the disodium phosphate stage was obtained. Metal phosphates which precipitated were removed by filtration. The filtrate contained $P_2O_5$ and contaminants in the following proportions in ion-form.

| | | |
|---|---|---|
| $P_2O_5$ | percent by weight | 16.0 |
| As (related to $P_2O_5$) | parts per million | 8 |
| $SO_3$ | percent by weight | 0.05 |
| Fe | do | 0.016 |
| Al | do | 0.030 |
| F | parts per million | 500 |

Of the solution so obtained, which contained 45% by weight solid matter, a 180 liter proportion was sprayed, per hour, with 60 kg. steam in a spray tower such as disclosed in German Patent No. 1,018,394. The tower was heated, per hour, with 40 cubic meters city gas and 200 cubic meters air. 650 cubic meters issuing gas having a temperature of 385° C., were allowed to escape, per hour, from the spray tower. 91 kg./hr. $Na_5P_3O_{10}$ containing fluorine in a proportion of 10 parts per million were obtained as the final product.

Example 2

100 kg. wet phosphoric acid, obtained by reacting uncalcined Florida-phosphate with sulfuric acid, were admixed with 8 kg. 50% sodium hydroxide solution, 3 kg. sodium sulfide and 3.5 kg. barium carbonate. After precipitated matter had been separated, the solution was admixed with 50 kg. 50% sodium hydroxide solution. Filtrate, which remained after precipitated phosphate had been removed by filtration, contained $P_2O_5$ and contaminants in the following proportions:

| | | |
|---|---|---|
| $P_2O_5$ | percent by weight | 19.0 |
| As (related to $P_2O_5$) | parts per million | 13 |
| Fe (related to $P_2O_5$) | percent by weight | 0.015 |
| Al | do | 0.028 |
| $So_3$ | do | 0.05 |
| F | parts per million | 2400 |

Of the filtered matter so obtained, which contained 57% by weight solid matter, a 180 liter proportion was sprayed with 60 kg. per hour steam in a spray tower of the type disclosed in German Patent No. 1,018,394. The tower was heated, per hour, with 36 cubic meters city gas and 180 cubic meters air. 500 cubic meters issuing gas having a temperature of 415° C. were removed from the tower per hour. 123 kg./hr. $Na_5P_3O_{10}$ containing fluorine in a proportion of 25 parts per million were obtained as the final product.

Example 3

100 kg. wet phosphoric acid, obtained by reacting Kola-phosphate with sulfuric acid, were reacted with 16 kg. 50% sodium hydroxide solution and 4 kg. barium sulfide and precipitated matter was separated by means of a filter press. The filtrate was neutralized with 60 kg. 50% sodium hydroxide solution and precipitating metal phosphate was filtered off. The resulting solution contained $P_2O_5$ and contaminants in the following proportions:

| | | |
|---|---|---|
| $P_2O_5$ | percent by weight | 20.1 |
| As (related to $P_2O_5$) | parts per million | 5 |
| Fe | percent by weight | 0.010 |
| Al | do | 0.012 |
| $SO_3$ | do | 0.09 |
| F | parts per million | 965 |

Of the filtrate so obtained, which contained 50% by weight solid matter, a 180 liter proportion was sprayed, per hour, with 450 cubic meters compressed air. The spray tower was heated with 40 cubic meters city gas and 200 cubic meters air. 850 cubic meters issuing gas having a temperature of 400° C. were removed from the tower per hour. 108 kg. $Na_4P_2O_7$ containing fluorine in a proportion of 18 parts per million were obtained per hour as the final product.

We claim:
1. A single step process for producing substantially pure alkali metal polyphosphates from corresponding impure substantially neutralized alkali phosphate solutions containing about 100 to 5000 p.p.m. fluorine based on $P_2O_5$ and having a ratio of alkali metal oxide to $P_2O_5$ corresponding to that desired in the final product; comprising spraying the impure alkali salt in a spray tower as a solution containing 40–70% solids; regulating temperature and moisture conditions to effect insuance of off-gas above about 300° C. and a content of 150–400 gm. water per kg. off-gas evolved; and recovering the resulting condensed alkali metal polyphosphate product.

2. The process of claim 1 wherein alkali metal pyrophosphates are produced.

3. The process of claim 1 wherein alkali metal polyphosphates are produced.

4. The process of claim 1 wherein the alkali metal phosphate solution contains fluorine in a proportion of 300 to 4500 parts per million.

5. The process of claim 1 wherein the off-gas leaving the spray tower has a temperature of about 340–420° C.

6. The process of claim 1 wherein the off-gas leaving the spray tower has a moisture content of 200–300 grams water per kg. of gas.

7. A process as claimed in claim 1 wherein the phosphate solution contains about 50% by weigh tsolid matter.

References Cited

UNITED STATES PATENTS 2,977,317   3/1961   Rodis et al. _____ 252—135

FOREIGN PATENTS 594,033   3/1960   Canada.

EARL C. THOMAS, *Primary Examiner.*

L. A. MARSH, *Assistant Examiner.*